No. 838,022. PATENTED DEC. 11, 1906.
P. O. HAYS.
ACETYLENE GAS GENERATOR.
APPLICATION FILED NOV. 21, 1905.
2 SHEETS—SHEET 1.
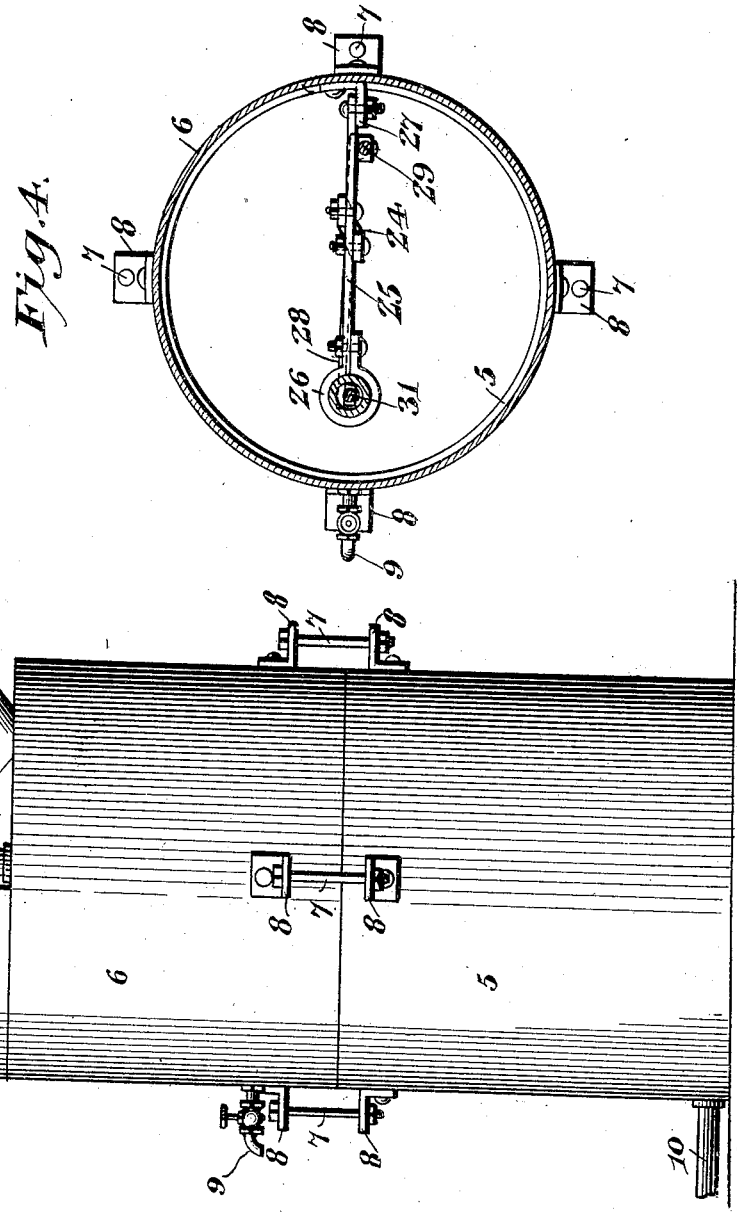
Witnesses
Jas. K. McCathran
B. G. Foster
P. O. Hays, Inventor
By E. G. Siggers
Attorney No. 838,022. PATENTED DEC. 11, 1906.
P. O. HAYS.
ACETYLENE GAS GENERATOR.
APPLICATION FILED NOV. 21, 1905.
2 SHEETS—SHEET 2.
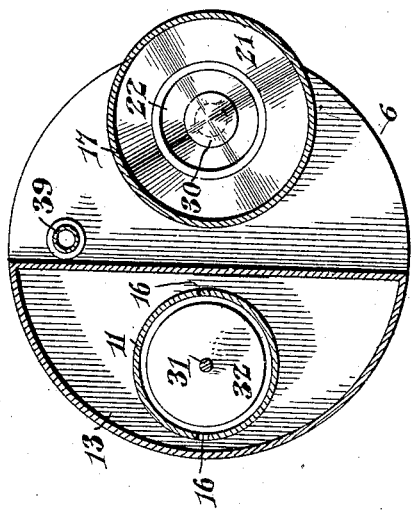
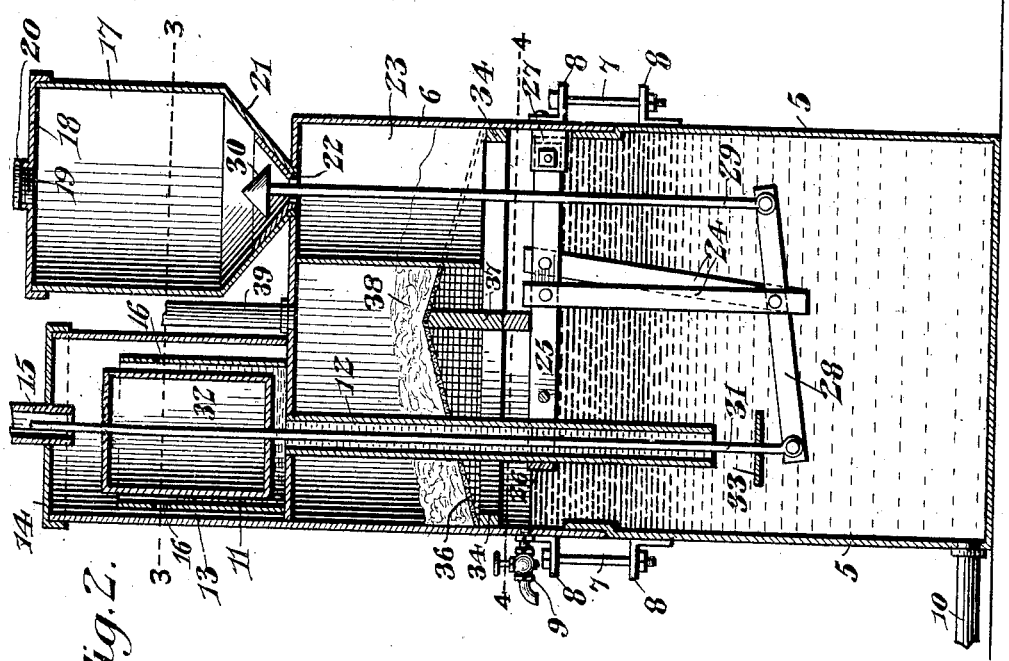

ary objects is to provide a novel and
UNITED STATES PATENT OFFICE.

PARX ORR HAYS, OF GAINESVILLE, TEXAS.

ACETYLENE-GAS GENERATOR.

No. 838,022.	Specification of Letters Patent.	Patented Dec. 11, 1906.

Application filed November 21, 1905. Serial No. 288,438.

*To all whom it may concern:*

Be it known that I, PARX ORR HAYS, a citizen of the United States, residing at Gainesville, in the county of Cooke and State of Texas, have invented a new and useful Acetylene-Gas Generator, of which the following is a specification.

The present invention relates to means for generating acetylene-gas; and one of the principal objects is to provide a novel and compact structure wherein the necessity of the usual cumbersome and bulky gas-bell or gasometer is eliminated.

More specifically, one of the principal features of the invention resides in the provision of a float that constitutes the operating means for the carbid-controlling valve and is actuated in a novel manner by rising and falling water moved by the varying pressure of the gas in the combined gas-generating and liquid reservoir.

The preferred embodiment of the invention is illustrated in the accompanying drawings, wherein—
Figure 1 is a side elevation of the machine. Fig. 2 is a vertical sectional view therethrough. Fig. 3 is a horizontal sectional view on the line 3 3 of Fig. 2. Fig. 4 is a horizontal sectional view on the line 4 4 of Fig. 2.

Similar reference-numerals designate corresponding parts in all the figures of the drawings.

In the embodiment illustrated a combined gas generator and reservoir is employed, which is preferably made up of sections 5 and 6, the bottom section 5 having its upper end telescoped in the top section 6 and said sections being secured together in any suitable or desirable manner—as, for instance, by bolts 7, which bridge the joints and are engaged in ears 8, carried by the sections. Connected to the upper section is a water-gage cock 9, and connected to the lower portion of the bottom section is a drain-pipe 10.

Mounted on the top of the reservoir is a float-chamber 11, having communication with said reservoir through a liquid-conducting pipe 12, depending from said chamber and having its lower end disposed below the level of the water in the reservoir. This float-chamber is surrounded and inclosed by an overflow-chamber 13, having a top 14, provided with a combined air-vent and guide-tube 15. Openings 16 are preferably formed in the side walls of the float-chamber 11 near the upper end thereof and constitute water passage-ways between the two chambers. A carbid-holder 17 is also mounted on the top of the reservoir and is provided with a cap 18, having a filling-opening 19, ordinarily closed by a suitable plug or other device 20. The carbid-holder has a hopper-bottom 21, reinforced, as shown at 22, and communicating with the upper portion of the reservoir, a tubular conduit 23 being formed in the reservoir below said communication and constituting carbid-directing means.

A hanger-stirrup 24, preferably composed of a doubled strap, the ends of which are offset from each other, is suitably suspended within the reservoir—as, for instance, by means of a supporting-bar 25, one end of which embraces and is clamped upon the pipe 12, as shown at 26, the other end being bolted to an ear 27, secured to the inner wall of the upper section 6. Fulcrumed between its ends in the lower portion of the stirrup 24 is a lever 28, to one end of which is pivoted a valve-stem 29, said valve-stem extending through the conduit 23 and nipple 22 and having at its upper end a conical valve 30, that controls the passage of the carbid through said nipple. Pivotally connected to the other end of the lever 28 is a draft-link 31, which link extends longitudinally through the liquid-conducting pipe 12 and through the float-chamber 11, the upper end of the link being slidably engaged in the combined float and guide-tube 15. A float 32, located in the float-chamber, is mounted upon said link and is held against movement thereon in any suitable manner. Secured to the lower portion of the draft-link 31 is a guard-plate 33, that is of greater diameter than the lower end of the pipe 12 and serves to prevent the bubbles of gas from entering said pipe.

A gas-filter is provided which is arranged in the upper portion of the reservoir above the level of the water. For this purpose a supporting-ring 34 is arranged within the reservoir and is held in place by a bar 35, that rests upon the bar 25. A foraminous wall 36, supported at its margins on the wall 34, also has a central support 37, resting on the bar 25. Above this foraminous wall is a packing 38 of cotton, asbestos, or other fiber. This fiber extends entirely across the reservoir and surrounds the pipe 12 and the conduit 23. Above the same a service-pipe 39 is connected to the reservoir.

With this structure it will be apparent that if the holder 17 is charged with carbid, under ordinary conditions the float 32 being in its lowermost position, the valve 30 will be raised, as shown in Fig. 2. Consequently said carbid can feed from the holder through the conduit into the reservoir. Here it will come into contact with the water, so that gas will be formed, and the pressure of this gas when sufficient will force the water in the reservoir up the pipe 12 and into the float-chamber. Consequently the float will be raised, thereby swinging the lever and drawing the valve downwardly into closed position, cutting off the feed of carbid. If now gas is drawn off through the service-pipe 39, it will be apparent that the pressure being reduced the level of the water in the float-chamber will be lowered, allowing a corresponding movement of the float, thereby reopening the valve. Consequently it will be seen that the generation of gas is automatically controlled by the consumption thereof, and, moreover, this is accomplished without the necessity of the ordinary gasometer. Furthermore, as the gas necessarily passes through the filter it will be freed from all impurities. Water is supplied to the machine through the guide-tube 15, the float-chamber 11, and the pipe 12, and the residuum can be drained off through the pipe 10. If there should from any cause be an excessive formation of gas, the water can freely pass from the float-chamber into the overflow-chamber, and if this should be insufficient to relieve the abnormal pressure the gas, after expelling the water below the level of the pipe 12, will finally enter said pipe and escape through the vent 15, thus avoiding danger of explosion.

It will be apparent from the above that an exceedingly simple structure is provided which will automatically control the generation of gas accordingly as the same is used. The parts are, moreover, elementary in their nature and are not liable to become injured or deranged.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In an acetylene-gas generator, the combination with a gas-generating reservoir, of a carbid-holder and a float-chamber mounted side by side on the reservoir, said carbid-holder having a passage-way communicating with the upper portion of the reservoir, a liquid-conducting pipe depending from the bottom of the float-chamber into the reservoir, a lever located wholly within the reservoir and fulcrumed between its ends, the fulcrum being disposed between the pipe and passage-way and the ends of the lever being located respectively beneath said pipe and passage-way, a float located in the chamber, a link connected to the float and depending through the pipe, said link being connected to the end of the lever beneath the pipe, and a stem connected to the other end of the lever and carrying a valve that controls the passage-way.

2. In an acetylene-gas generator, the combination with a gas-generating reservoir comprising a lower and an upper section, of means for detachably securing the sections together, a carbid-holder and a float-chamber mounted on and carried by the upper portion of the upper section, a depending conduit connecting the float-chamber and reservoir and supported by the upper section, a float in the chamber, a valve controlling the supply of carbid from the holder to the reservoir, connections between the float and valve, and supporting means for the connections carried by the upper section.

3. In an acetylene-gas generator, the combination with a gas-generating reservoir comprising a lower and an upper section, of means for detachably securing the sections together, a carbid-holder and a float-chamber mounted on and carried by the upper end of the upper section, a depending liquid-conduit connecting the float-chamber and reservoir and carried by the upper section, a float in the chamber, a valve controlling the supply of carbid from the holder to the reservoir, a supporting-bar carried by and located within the upper section, a lever mounted on the bar, and connections between the lever, and float and valve for operating the latter upon the movement of the former.

4. In an acetylene-gas generator, the combination with a gas-generating reservoir, of a float-chamber having a liquid-conducting pipe depending into the reservoir, a carbid-holder having communication with the reservoir, a support secured to the depending pipe, a lever fulcrumed on the support, a float in the chamber having a connection with the lever, and extending through the pipe, and a carbid-controlling valve also connected to the lever.

5. In an acetylene-gas generator, the combination with a gas-generating reservoir, comprising a lower and an upper section, of means for securing the sections together, a float-chamber mounted on the top of the upper section and having a liquid-conducting pipe depending into the reservoir, a carbid-holder mounted on the top of the upper section and communicating with the reservoir, a supporting-bar clamped to the pipe and secured to the upper section, a yoke secured to the bar, a lever fulcrumed between its ends upon the yoke, one end of the lever being disposed beneath the depending end of the pipe, a float located in the float-chamber and having a connection with the end of the lever disposed beneath the pipe, said connection extending through the pipe, and a carbid-controlling valve connected to the other end of the lever.

6. In an acetylene-gas generator, the combination with a gas-generating reservoir, of a float-chamber having a liquid-conducting pipe depending into the reservoir, a top extending over the float-chamber, a combined vent-pipe and guide connected to the top in line with the depending pipe, a lever, a float located in the float-chamber, a link connected to the lever and to the float and slidably engaging in the vent-pipe, said link extending through the depending pipe, and a carbid-controlling valve connected to the lever.

7. In an acetylene-gas generator, the combination with a gas-generating reservoir, of a carbid-holder communicating therewith, a valve controlling the supply of carbid from the holder into the reservoir, a float-chamber mounted on top the reservoir and having a depending pipe communicating with said reservoir, a float located in the chamber, connections between the float, a valve including a device extending through the depending pipe, an overflow-chamber surrounding the float-chamber and having a top, and a vent-pipe connected to the top of the overflow-chamber, said float-chamber having communication at its upper portion with the overflow-chamber.

8. In an acetylene-gas generator, the combination with a gas-generating reservoir, of a carbid-holder located thereon and having a tubular connection depending thereinto, a float-chamber located on the reservoir, a liquid-conducting pipe depending from the float-chamber into the reservoir below the lower end of the tubular connection, a lever fulcrumed between its ends and located wholly within the liquid-reservoir, a valve controlling the supply of carbid and having a stem pivoted to one end of the lever, a float located in the float-chamber, and a link connected to the float, said link extending through the liquid-conducting pipe and having a pivoted connection with the other end of the lever below the liquid-conducting pipe.

In testimony that I claim the foregoing as my own I have hereto affixed my signature in the presence of two witnesses.

PARX ORR HAYS.

Witnesses:
J. P. WEAR,
D. S. LACY.